(12) United States Patent
Hashemi et al.

(10) Patent No.: US 8,894,540 B2
(45) Date of Patent: Nov. 25, 2014

(54) METHOD AND APPARATUS FOR CONTROLLING ENGINE SHUTDOWN IN HYBRID VEHICLES

(75) Inventors: Siamak Hashemi, Farmington Hills, MI (US); Yulei Chen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 13/613,542

(22) Filed: Sep. 13, 2012

(65) Prior Publication Data

US 2014/0073478 A1  Mar. 13, 2014

(51) Int. Cl.
| | | |
|---|---|---|
| B60W 10/02 | (2006.01) | |
| B60W 10/06 | (2006.01) | |
| B60W 10/08 | (2006.01) | |
| B60W 10/10 | (2012.01) | |

(52) U.S. Cl.
USPC .............................................. 477/5; 477/115

(58) Field of Classification Search
USPC ..................................... 477/5, 115
See application file for complete search history.

(56) References Cited

U.S. PATENT DOCUMENTS

| | | |
|---|---|---|
| 6,558,290 B2 | 5/2003 | Phillips et al. |
| 7,217,221 B2 | 5/2007 | Sah et al. |
| 8,109,855 B2 | 2/2012 | Le Neindre et al. |
| 2004/0127327 A1* | 7/2004 | Kahlon et al. ..................... 477/5 |
| 2008/0127935 A1* | 6/2008 | Park .............................. 123/332 |

* cited by examiner

*Primary Examiner* — Edwin A Young
(74) *Attorney, Agent, or Firm* — David B. Kelley; Brooks Kushman P.C.

(57) ABSTRACT

A hybrid vehicle is provided that includes a control system that controls the time required for engine shut down. An electric machine or integrated starter-generator may be used to apply a load to the combustion engine after an engine shut down signal is received. By reducing the time required to shut down the engine in a controlled manner, the catalytic converter can be conditioned by providing a desired volume of air and fuel to the catalyst to reduce emissions and increase fuel economy. If an indication is received that it is no longer desirable to shut down the engine, the engine may be restarted conventionally or started in a quick start mode by refueling the engine is the engine operating at a sufficient speed for a quick restart.

16 Claims, 6 Drawing Sheets

METHOD AND APPARATUS FOR CONTROLLING ENGINE SHUTDOWN IN HYBRID VEHICLES

TECHNICAL FIELD

This disclosure is directed to using either an electric machine or a belt driven integrated starter generator (ISG) of a hybrid electric vehicle to control the engine during engine shut down that, in turn, controls the volume of air and fuel supplied to the catalyst of the catalytic converter.

BACKGROUND

In hybrid vehicles the engine is stopped when no torque is required from the engine to save fuel, reduce emissions and reduce noise. Current hybrid vehicles shut off the fuel supplied to the engine and let the engine come to stop without further control. However, following this method, the engine comes to a complete stop after a variable period of time depending on the engine temperature, speed, throttle position, etc.

Another drawback is that the engine acts like an air pump during engine shut down, pumping air into the catalyst that is stored in the catalytic converter. Air stored in the catalytic converter causes a NOx spike during subsequent startup of the engine. Another issue with uncontrolled engine stopping is the level of noise, vibration and harshness that results from engine shutdown.

This disclosure of engine control methods and systems is directed to solving the above problems and other problems as summarized below.

SUMMARY

This disclosure proposes different methods for engine shutdown depending on the technology used in the vehicle and available hardware. In a vehicle having one type of modular hybrid transmission architecture there is a disconnect clutch between the engine and the traction motor.

The proposed solution in this case is that after shutting off the fuel to the engine, negative torque is applied on the disconnect clutch by the electric machine to ramp down the engine to a complete stop. The slope of the ramp can be controlled by controlling the amount of negative torque applied by the electric machine to the disconnect clutch. Some air in the catalytic converter is desirable to reduce the hydrocarbons present in the catalyst at startup. This extra air in the catalytic converter also facilitates the catalyst light-off. The amount of air in the catalytic converter is controlled by the rate of engine deceleration during shutdown.

Having a controlled shutdown using the disconnect clutch offers the advantage of speeding up the engine startup time during a change of mind event when the engine needs to be started because additional engine torque is required. The air/fuel ratio and the throttle position can be calibrated to reduce the noise, vibration and harshness by preparing the catalytic converter during engine shutdown when the engine deceleration rate is known.

In another type of hybrid transmission, which may be referred to as a mild hybrid, the engine is shut down when the vehicle is stopped. In a mild hybrid a belt integrated starter generator is used to charge the battery as the engine decelerates. The rate of deceleration can be controlled by changing charge rate of the integrated starter generator.

According to one aspect of this disclosure, a vehicle control system is provided that comprises an engine, an electric machine, a disconnect clutch and a transmission selectively receiving torque from one or both of the engine and the electric machine. The electric machine may be engaged through the disconnect clutch in response to an engine shut down signal to reduce the speed of the engine and to cut fuel to the engine until the engine is stopped.

According to other aspects of the above control system, the hybrid vehicle control system may be configured to set the transmission to neutral, close the disconnect clutch, and set a torque converter to neutral when the electric machine is utilized to reduce the speed of the engine and provide energy to the battery in response to the engine shut down signal. The vehicle control system may further comprise a battery providing energy to the electric motor. In response to the engine shut down signal, the electric machine is set in its generator mode to provide energy to recharge the battery.

In response to a signal to override the engine shut down signal, the vehicle control system may determine that the speed of the engine is less than a calibrated value and the electric machine may be utilized to increase the speed of the engine and restart the engine. Alternatively, in response to a signal to override the engine shut down signal, the vehicle control system may determine that the speed of the engine is greater than a calibrated value and the engine may be provided with fuel and spark in non-diesel fuel applications to restart the engine.

According to another aspect of this disclosure, the electric machine may be used to control time required to stop the engine to limit a volume of air provided to a catalytic converter during engine shut down.

According to another aspect of this disclosure, a mild hybrid vehicle control system is provided that comprises an engine, a starter motor for starting the engine, a battery that is utilized to provide power to the starter motor, and an alternator for charging the battery. The starter motor may be engaged in response to an engine shut down signal to reduce the speed of the engine by increasing a charge rate of the alternator. The starter motor and generator may be combined into an integrated starter generator.

The starter may be utilized to increase the speed of the engine and restart the engine in response to a signal to override the engine shut down signal when the speed of the engine is determined to be less than a calibrated value.

The engine may be provided with fuel to restart the engine in response to a signal to override the engine shut down signal when the speed of the engine is determined to be greater than a calibrated value.

The starter motor may be used to control the time required to stop the engine to limit a volume of air provided to a catalytic converter during engine shut down.

According to another aspect of this disclosure, a method is provided for operating a vehicle control system that includes an engine, an electric motor that is used to start the engine, a battery that provides energy to the electric motor, and a transmission that provides torque from the engine to a traction wheel of a vehicle. The method comprises providing an engine shut down signal to the vehicle control system. Disengaging the engine from the transmission and charging the battery with the electric motor to reduce the time required to reduce the speed of the engine to zero.

According to other aspects of the disclosure, the electric motor may function as a starter. The vehicle control system may further comprise a disconnect clutch that is selectively engaged to transfer torque between the engine and the electric motor, and wherein the electric motor is an electric machine that is operable to provide torque to the transmission. The method may further comprise engaging the disconnect clutch in response to the engine shut down signal to reduce the speed of the engine, and cutting off fuel to the engine until the engine is stopped.

The method may further comprise setting the electric machine in a generator mode to provide energy to recharge the battery in response to the engine shut down signal. In addition, the method may further comprise setting the transmission to neutral, and setting a torque converter to neutral when the electric machine is utilized to reduce the speed of the engine and provide energy to the battery.

The method may further comprise restarting the engine in response to a signal to override the engine shut down signal when the speed of the engine is determined to be less than a calibrated value and the electric machine is utilized to increase the speed of the engine and restart the engine. Alternatively, the method may further comprise restarting the engine in response to a signal to override the engine shut down signal when the speed of the engine is determined to be greater than a calibrated value and the engine is provided with fuel to restart the engine.

According to yet another aspect of this disclosure, the method may further comprise controlling the time required to stop the engine to limit a volume of air provided to a catalytic converter during engine shut down.

The above aspects of this disclosure and other aspects will be better understood in view of the attached drawings and the following detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
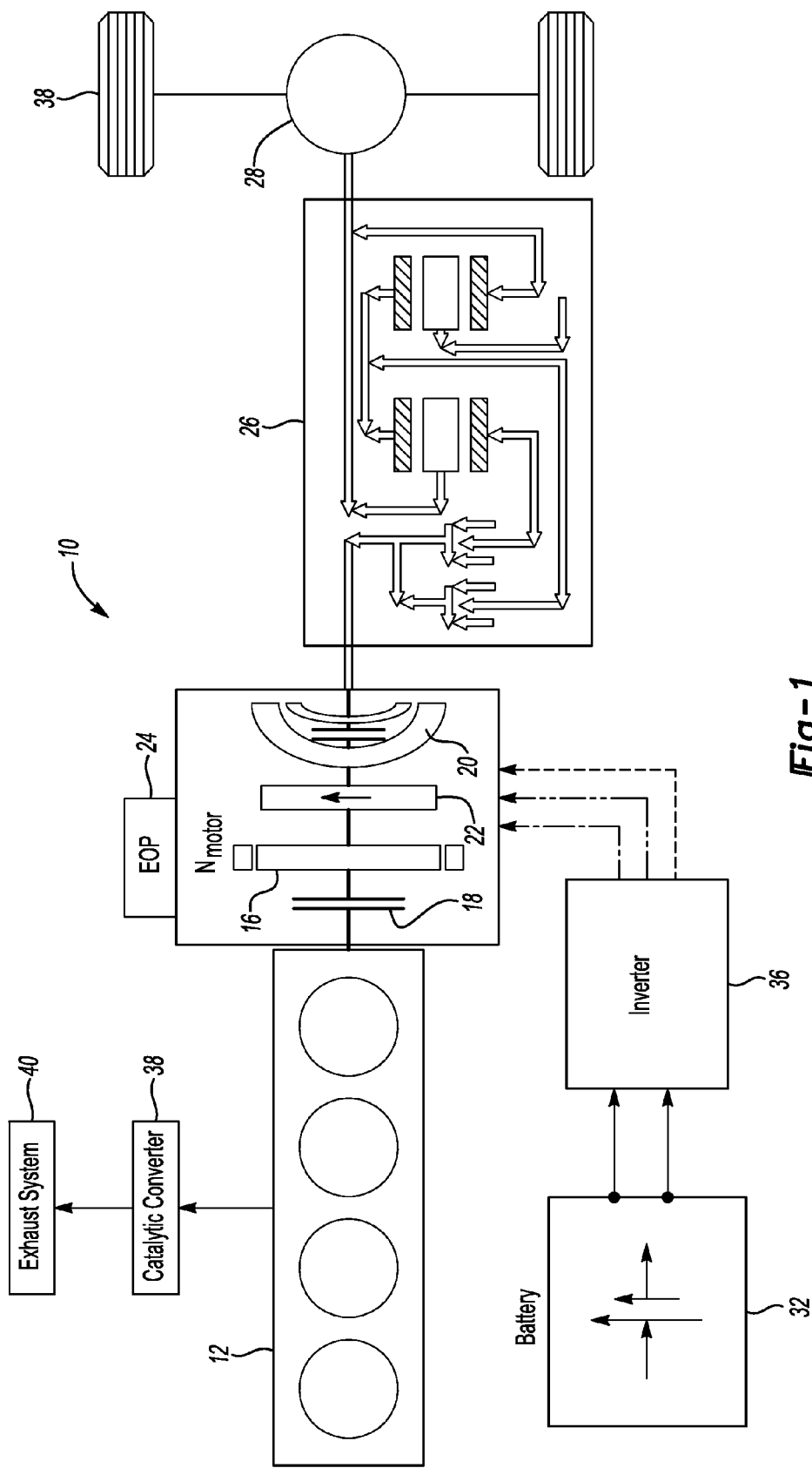
FIG. 1 is a diagrammatic view of a vehicle control system for a modular hybrid vehicle having a combustion engine and an electric machine that are selectively operated in combination or independently.

Referring to FIG. 1, a hybrid vehicle 10 is diagrammatically illustrated to show the torque flow path, charging system and exhaust system. A combustion engine 12 and an electric machine 16 are selectively connected to a disconnect clutch 18 so that torque may be provided by the combustion engine 12, the electric machine 16, or both. A torque converter 20 provides torque from the combustion engine 12 and the electric machine 16 to a multi-step gear transmission 26.

A main oil pump 22 provides hydraulic line pressure to the torque converter and the transmission to control shifting the transmission 26. An electric oil pump 24 may also be provided to supplement supplying hydraulic line pressure when the main oil pump 22 is not capable of providing adequate line pressure to the torque converter 20 and transmission 26. The transmission 26 provides torque to the differential 28 which in turn provides torque to the wheels 30.

A battery 32 is connected through an inverter 36 to the electric machine 16. The inverter 36 provides power to the electric machine 16. In the charging mode, the electric machine 16 supplies current to the inverter 36 that is used to charge the battery 32.

The combustion engine 12 can be a diesel engine or an internal combustion engine. The combustion engine 12 directs exhaust gases to a catalytic converter 38 containing a catalyst that is used to reduce emissions of the combustion engine. The catalytic converter 38 is connected to the other components of an exhaust system 40, such as a muffler and exhaust pipes.

Figure 2:
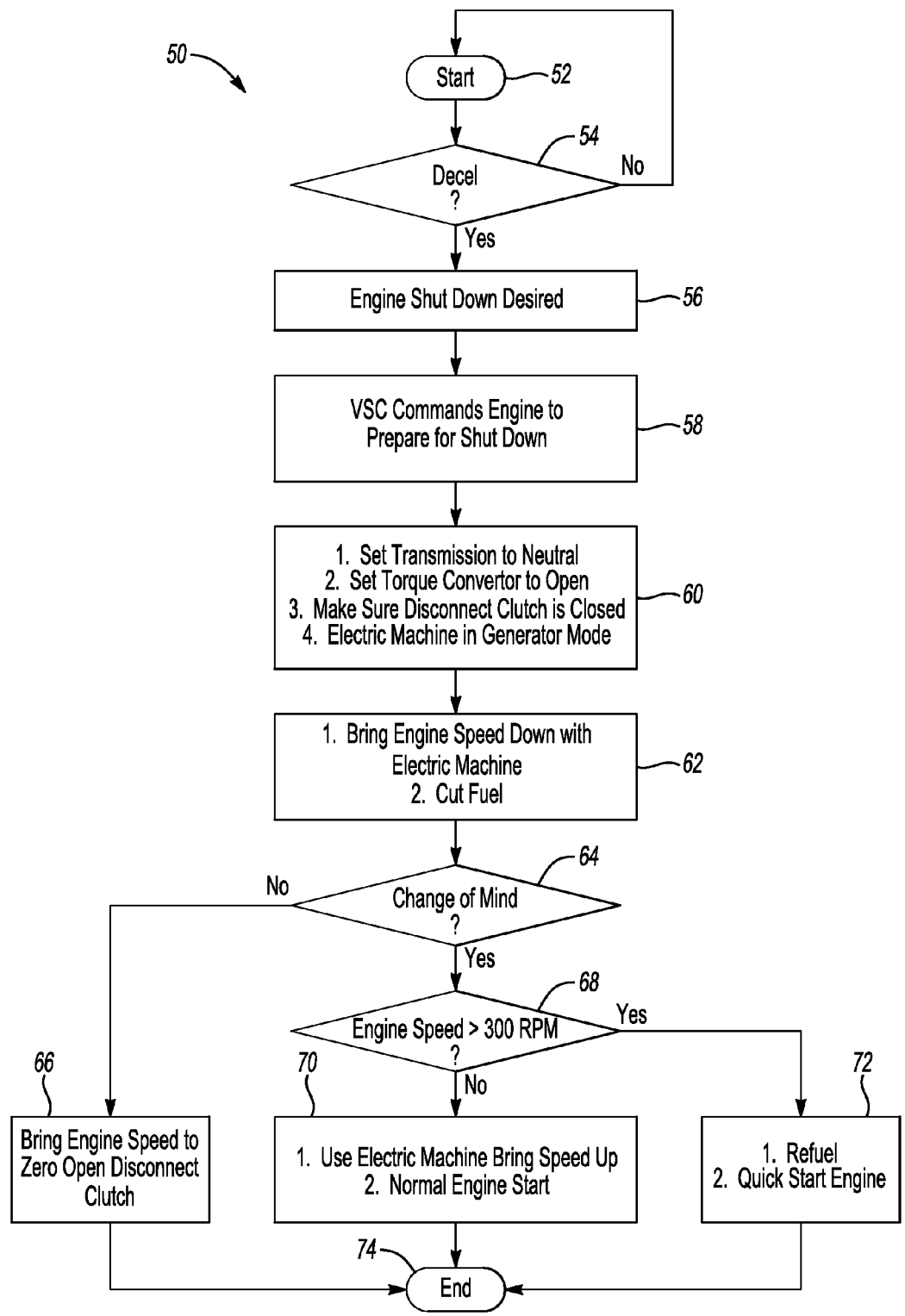
FIG. 2 is a flow chart of the controlled engine shut down process according to one embodiment of this disclosure.

Referring to FIG. 2, an algorithm 50 for controlling engine shut down is illustrated. Engine shut down is controlled to reduce the time required to stop the engine in response to an engine shut down signal. By reducing the time required for engine shut down, the amount of air and fuel provided by combustion engine 12 to the catalytic converter 38 may be controlled to reduce NOx emissions and reduce fuel consumption.

The algorithm 50 begins at start 52. The system determines whether it is desired to decelerate the vehicle at 54. If the vehicle is not to be decelerated, algorithm returns to start at 52. If deceleration is detected at 54, the system is set at 56 for engine shut down. The vehicle system control commands the engine at 58 to prepare for shut down. The system control at 60 sets the transmission to neutral so that no torque is provided from either the engine 12 or the electric machine 16 to the wheels 30.

The system then opens the torque converter 20. The disconnect clutch 18 between the combustion engine 12 and the electric machine 16 is closed to allow torque to be transferred from the electric machine 16 through the disconnect clutch 18 to the combustion engine 12. At the same time, the control system switches the electric machine 16 to the generator mode so that torque is provided by the combustion engine through the disconnect clutch 18 to the electric machine 16. The electric machine receives the torque from the combustion engine 12 and provides current through the inverter 36 to recharge the battery 32.

At 62, the engine speed is brought down by virtue of its connection through the disconnect clutch 18 to the electric machine 16. By connecting the electric machine through the internal combustion engine 12, engine speed may be reduced by about 2000 rpm in less than 100 milliseconds. In comparison, conventional engine shut down normally requires approximately 2400 milliseconds to shut down after receiving an engine stop instruction. By connecting the electric machine 16 to the combustion engine 12, the combustion engine shut down may be reduced to approximately 360 ml. It should be understood that the actual time required to shut down will vary depending upon the design of the combustion engine 11 and electric machine 16. By more rapidly reducing the time required for engine shut down, the quantity of fuel consumed during engine speed ramp down may be minimized.

By minimizing engine shut down time, the amount of air from the combustion engine 12 flowing into catalytic converter 38 is minimized. Air pumped into the catalyst by the combustion engine must be balanced with fuel to minimize NOx emissions. The fuel injected into the combustion engine is minimized when no torque is being demanded from the engine.

The time required for engine speed ramp down is initially substantially reduced. Less air is provided to the catalyst and therefore less fuel is needed to balance that air in the catalytic converter 38.

With continuing reference to FIG. 2, at the same time the engine speed is being reduced, the fuel to the combustion engine 12 is cut off. The vehicle control system checks at 64 as to whether there is an indication that it is no longer desired to shut the combustion engine down in the block labeled "Change of Mind?" If there has been no change of mind, the system brings the engine speed to zero and the disconnect clutch is opened at 66.

If there has been a change of mind and it is desired to not shut down the combustion engine 12, the system checks at 68 to determine whether the engine speed is less than 300 rpm. The 300 rpm value is a calibrated value which may be set to a range of potential engine speeds. If the engine speed is not more than 300 rpm, the system may use the electric machine to bring the speed up to the calibrated 300 rpm value and a normal engine start may be initiated at 70. If the engine speed is more than 300 rpm at 68, the engine may be simply restarted by refueling the engine at 72 to complete a quick start of the engine. The algorithm 50 concludes at end block 74.

Figure 3:
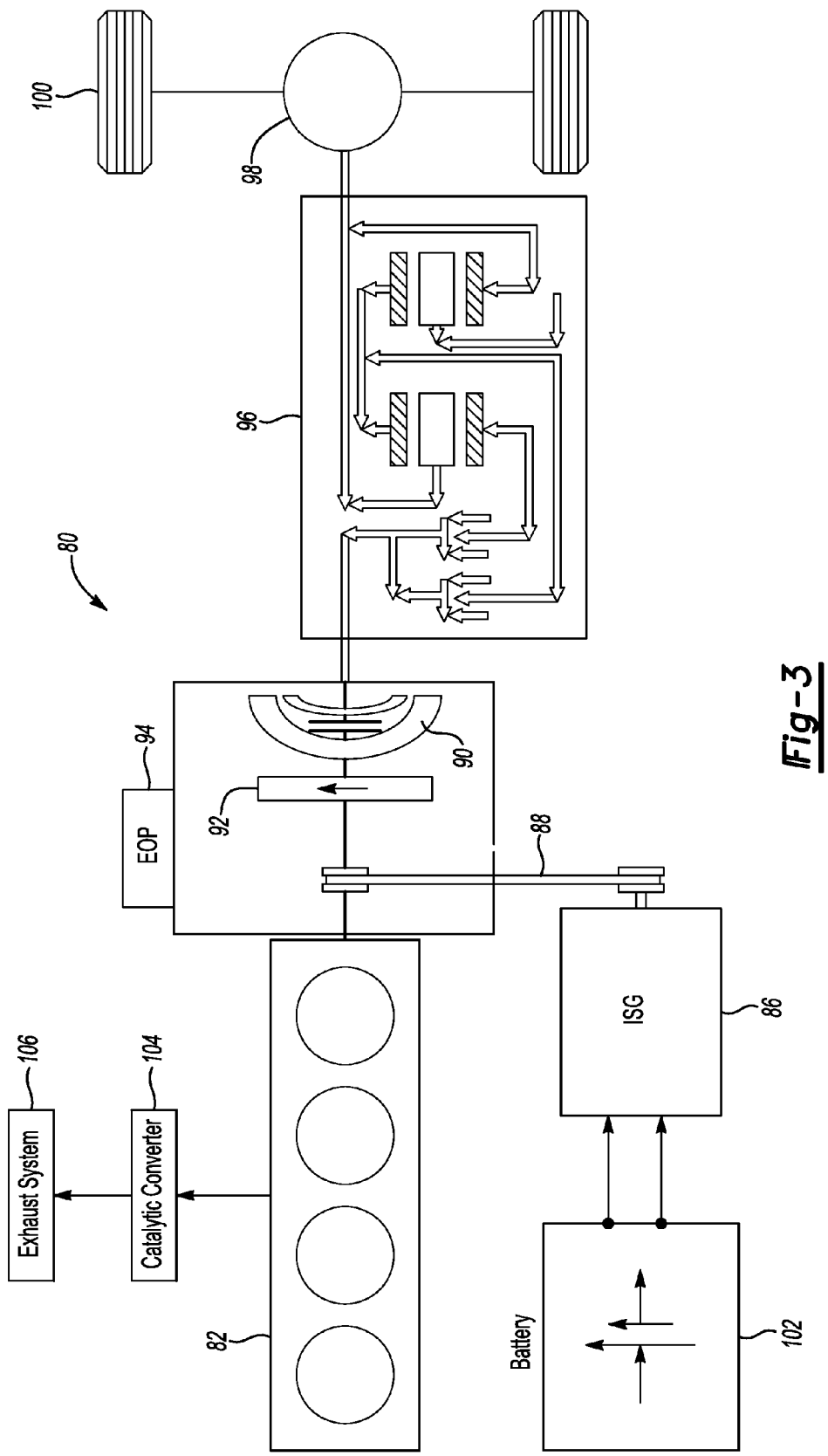
FIG. 3 is a diagrammatic view of an alternative embodiment vehicle control system for a mild or start-stop hybrid vehicle having a combustion engine and an internal starter generator that are selectively operated in combination or independently.

Referring to FIG. 3, an alternative embodiment is shown in which a mild hybrid or start/stop hybrid vehicle architecture is diagrammatically illustrated. The mild hybrid vehicle 80 includes a combustion engine 82. An integrated starter-generator (ISG) 86 is connected by a belt 88 to the output shaft of the combustion engine 82. Torque is provided from the combustion engine 82 through a torque converter 90 to drive the vehicle. A main oil pump 92 is also driven by the combustion engine 82 to provide hydraulic line pressure to the torque converter 90 and transmission 96. An electric oil pump 94 may be provided to supplement the main oil pump 92 especially at times when the combustion engine 82 is off or operating at a low speed. The transmission 96 provides torque through a differential 98 to the wheels 100.

A battery 102 provides power through the ISG 86 to start the combustion engine 82 when the engine is stopped and torque is desired from the engine 82. When it is desired to decelerate the vehicle and/or shut down the combustion engine 82, torque is transmitted to the belt 88 to the ISG 86 to recharge the battery 102.

The engine 82 functions as a pump by providing either exhaust, air or fuel to the catalytic converter 104 when the engine is shut down. The catalytic converter 104 is part of the vehicle exhaust system 106 and includes the muffler and exhaust pipes.

Figure 4:
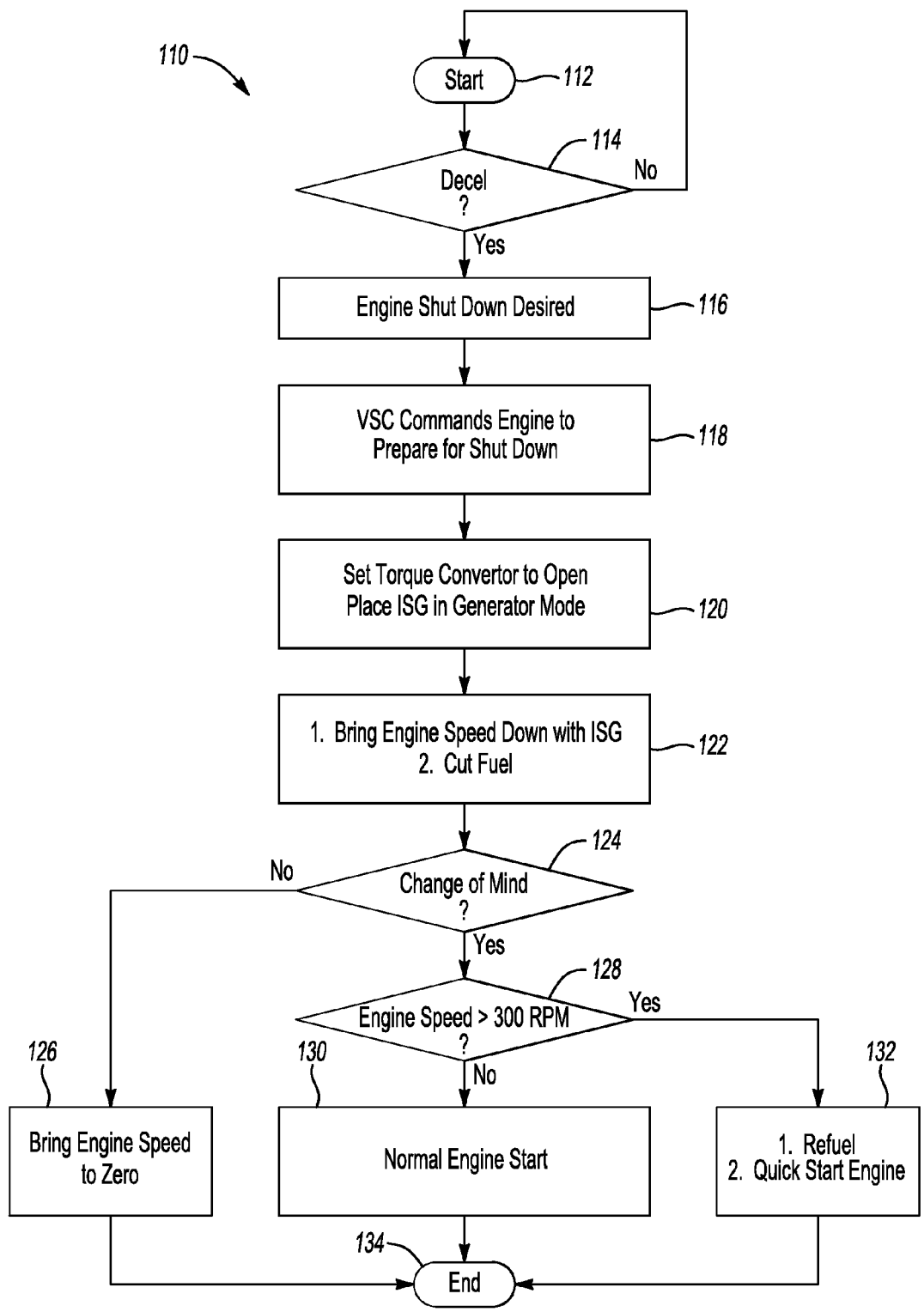
FIG. 4 is a flow chart of the alternative controlled engine shut down process according to the embodiment of FIG. 3.

Referring to FIG. 4, an alternative algorithm 110 is illustrated that is associated with the vehicle architecture illustrated diagrammatically in FIG. 3. The algorithm 110 begins at start block 112. The vehicle system control determines whether or not it is desired to decelerate the vehicle. If not, the algorithm returns to start 112. If the vehicle is to be decelerated as determined at 114, the system is set to indicate that engine shut down is desired at 116. The vehicle system control commands the engine to prepare for shut down at 118.

The vehicle is prepared for shut down at 120 by setting the torque converter to open and placing the ISG 86 in generator mode. At 122, the engine speed is reduced by increasing the current drawn from the generator as a result of increasing the field current. By increasing the field current, the ISG 86 draws more current and increases the load applied to the engine as it is shut down. This reduces the time required to complete an engine shut down operation. At the same time, the fuel to the combustion engine 82 is cut off. The vehicle system control then tests for a change of mind at 124. If the operator or system is not to be decelerated and does not require engine shut down at 124, fuel will be injected to restart the engine, otherwise the system continues to reduce the engine speed to zero at 126.

If a change of mind is indicated at 124, the system then determines at 128 whether the engine speed is greater than 300 rpm. Again, as with the embodiment of FIGS. 1 and 2, the engine speed setting of 300 rpm is the calibrated value that is set depending upon the speed required to restart the engine. If the engine speed is not greater than 300 rpm at 128, the engine is started at 130 with the ISG 86. If the engine speed at 128 is greater than 300 rpm, the engine may be restarted at 132 by simply refueling the engine 82 to quickly restart the engine. The algorithm concludes at end block 134.

Figure 5:
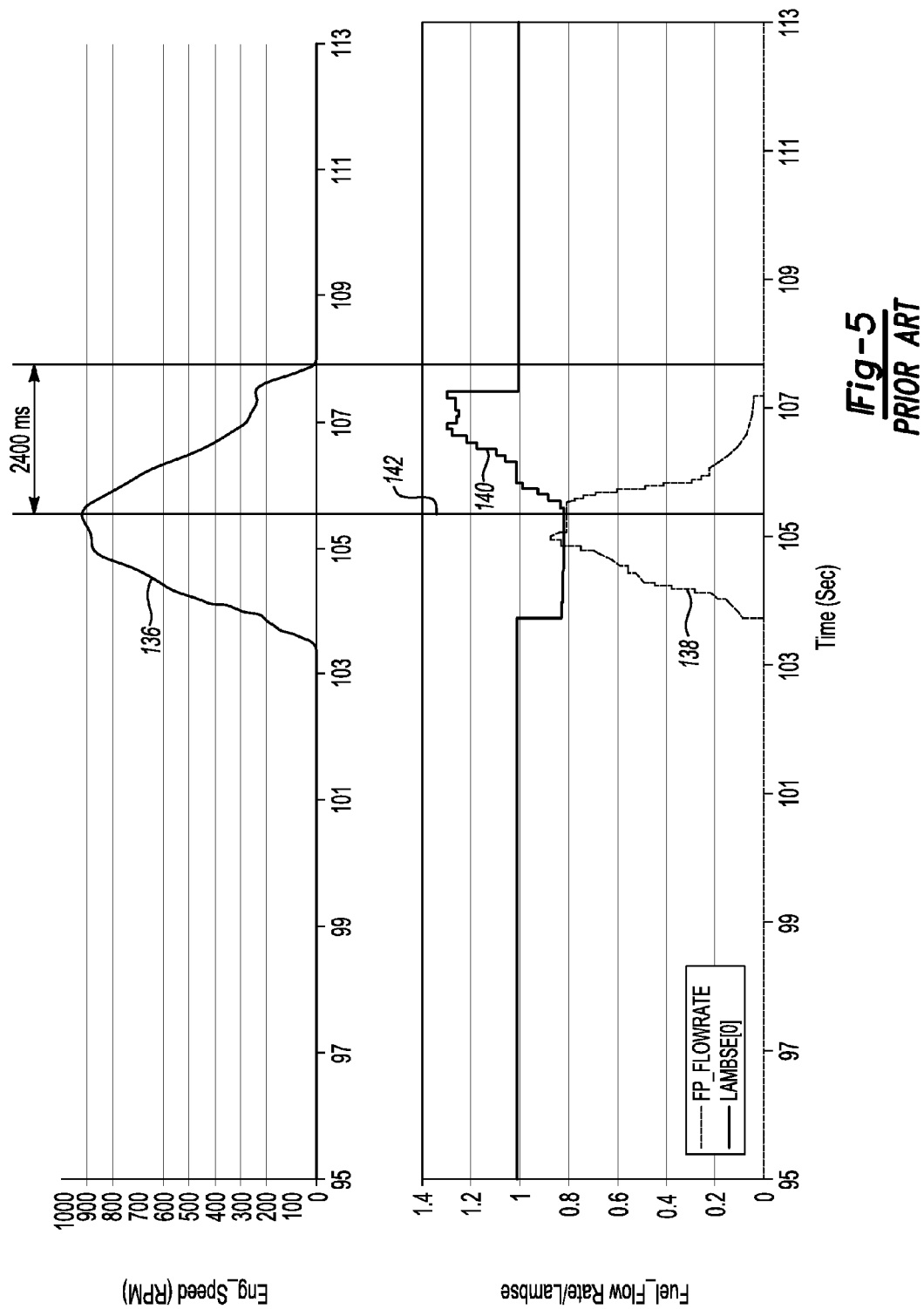
FIG. 5 is a set of graphs showing engine speed compared to fuel flow rate and Lambse over time during an uncontrolled engine shut down operation.

Referring to FIG. 5, during normal engine operation for the embodiments of both FIGS. 1 and 2 and the embodiments of FIGS. 3 and 4, engine speed shown by line 136 is controlled by supplying fuel to the engine. In FIG. 5, one example of a prior art uncontrolled engine shut down is illustrated. When an engine shut down is desired, the amount of fuel provided to the engine shown by line 138 is sharply reduced and the engine speed is reduced to zero over a period of approximately 2400 milliseconds. The quantity of fuel 138 provided to the engine follows the resultant engine speed 136 with fuel continuing to be provided to the engine 12, 82 during engine shut down. The air/fuel ratio or Lambse is shown by line 140 and is relatively lean during the period of normal operation until an engine shut down signal is received. Lambse 140 increases during engine shut down and provides a lean air/fuel ratio during the period of engine shut down.

The air/fuel ratio can be calibrated to reduce noise, vibration and harshness (NVH) and prepare the catalyst during engine shut down as a result of knowing the engine deceleration rate. The engine is shut down when no torque is required to save fuel and reduce emissions and noise. During engine shut down, the engine acts like a pump by supplying air to the catalytic converter 38, 104. The air pumped into the catalyst causes a NOx spike during the next engine start up event.

Figure 6:
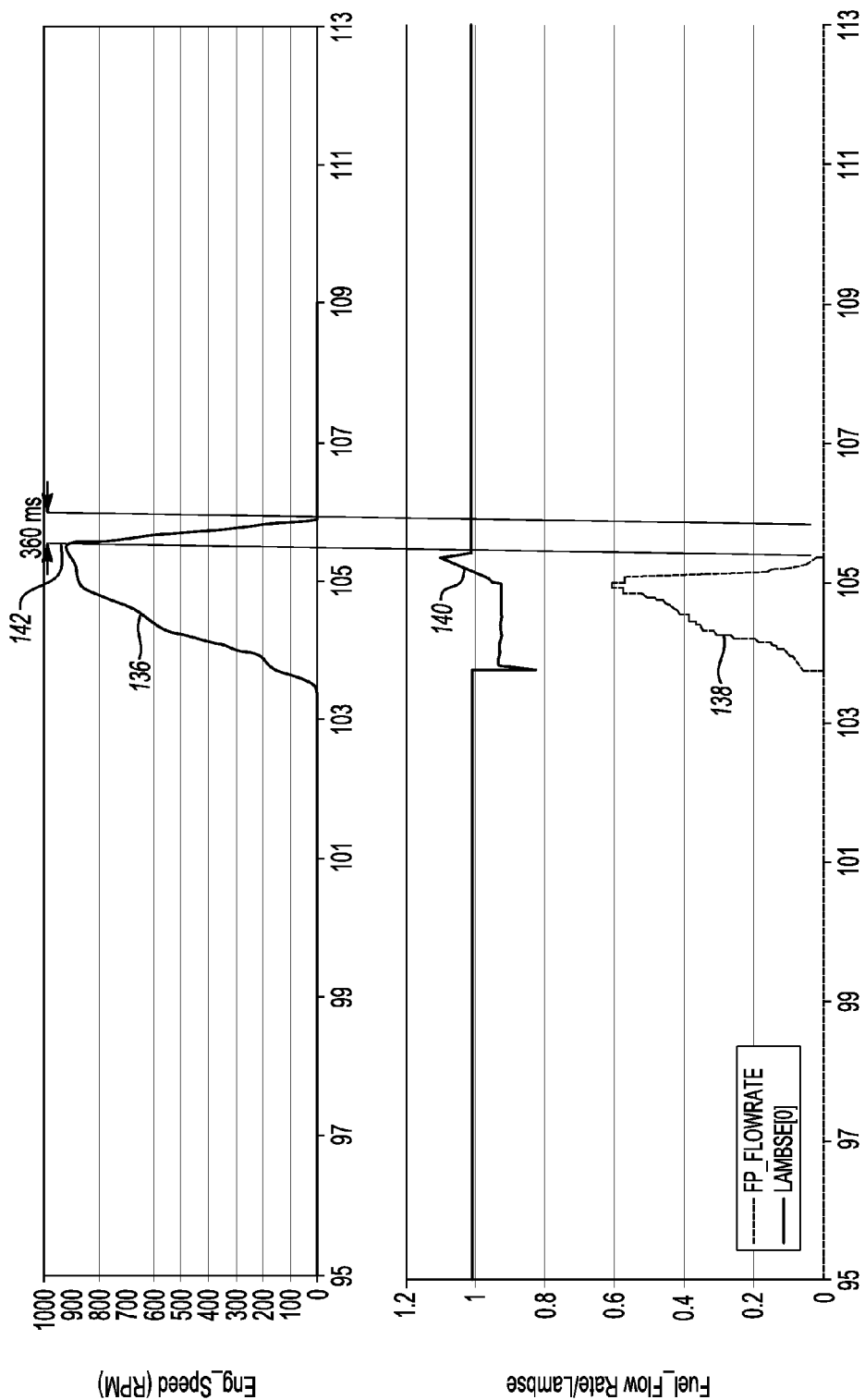
FIG. 6 is a set of graphs showing engine speed compared to fuel flow rate and Lambse over time during a controlled engine shut down operation.

Referring to FIG. 6, an example of a controlled engine shut down is illustrated. The engine speed 136 is initially at zero and increases until an engine shut down signal 142 is received. Torque from the engine 12, 82 is used by either the electric machine 16 or ISG 86 to charge the battery 32, 102. The fuel savings achieved is represented by the area under the fuel flow rate curve 138 in FIG. 6 as compared to the area under the fuel flow rate line 138 in FIG. 5. In FIG. 6, the fuel flow rate after the engine shut down signal is substantially zero. Referring to the Lambse line 140 in FIG. 6, Lambse is initially at about 1 until the engine is started and accelerated. Lambse then becomes relatively rich with a ratio of air to fuel of about 0.9. Upon engine shut down, Lambse becomes relatively lean with a ratio of air to fuel of about 1.1. As shown in FIG. 6, substantially less of the lean air/fuel mix is provided by the engine 12, 82 to the catalytic converter 38, 104.

By reducing the engine shut down time, the amount of air from the cylinders going into the catalyst is minimized. Any air going into the catalyst must be balanced with fuel to minimize emissions. The fuel injected during engine shut down when no torque is demanded from the engine is also minimized. By controlling engine speed during engine shut down allows for control over catalyst conditioning.

In some instances, it may be desirable to provide a rich air/fuel mixture to the catalyst. Air may then be supplied to the catalyst to create reaction thereby minimizing the catalyst light off time.

Since the motor is used to control the engine speed during engine shut down and a disconnect clutch is closed, no time is wasted ramping up the engine speed during a change of mind event because the clutch is already engaged. If the disconnect clutch is closed to ramp up the engine speed by providing torque from the electric machine, the engine and motor speed must be synchronized.

According to this disclosure, the air/fuel ratio is calibrated so that the catalyst is set up for the next engine restart. The air/fuel ratio is calibrated to minimize emissions, noise, vibration and harshness and also maximize fuel economy.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle control system comprising:
   an engine;
   an electric machine;
   a disconnect clutch;
   a transmission selectively receiving torque from one or both of the engine and the electric machine; and
   wherein the electric machine may be engaged through the disconnect clutch in response to an engine shut down signal to reduce speed of the engine and to cut fuel to the engine until the engine is stopped, wherein in response to the engine shut down signal the vehicle control system is configured to:
      set the transmission to neutral;
      close the disconnect clutch; and
      set a torque converter to neutral when the electric machine is utilized to reduce the speed of the engine and provide energy to a battery.

2. The vehicle control system of claim 1 further comprising the battery providing energy to the electric machine, and wherein in response to the engine shut down signal the electric machine is set in a generator mode to provide energy to recharge the battery.

3. The vehicle control system of claim 1 wherein in response to a signal to override the engine shut down signal when the speed of the engine is determined to be less than a calibrated value, the electric machine is utilized to increase the speed of the engine and restart the engine.

4. The vehicle control system of claim 1 wherein in response to a signal to override the engine shut down signal when the speed of the engine is determined to be greater than a calibrated value, the engine is provided with fuel to restart the engine.

5. The vehicle control system of claim 1 wherein the electric machine controls an amount of time required to stop the engine to limit a volume of air provided to a catalytic converter during engine shut down.

6. A vehicle control system comprising:
   an engine;
   a starter motor for starting the engine;
   a battery that is utilized to provide power to the starter motor;
   an alternator for charging the battery;
   wherein the starter motor may be engaged in response to an engine shut down signal to reduce a speed of the engine by increasing a charge rate of the alternator; and
   wherein in response to a signal to override the engine shut down signal when the speed of the engine is determined to be less than a calibrated value, the starter is utilized to increase the speed of the engine and restart the engine.

7. A vehicle control system comprising:
   an engine;
   a starter motor for starting the engine;
   a battery that is utilized to provide power to the starter motor;
   an alternator for charging the battery;
   wherein the starter motor may be engaged in response to an engine shut down signal to reduce a speed of the engine by increasing a charge rate of the alternator; and
   wherein in response to a signal to override the engine shut down signal when the speed of the engine is determined to be greater than a calibrated value, the engine is provided with fuel to restart the engine.

8. A vehicle control system comprising:
   an engine;
   a starter motor for starting the engine;
   a battery that is utilized to provide power to the starter motor;
   an alternator for charging the battery;
   wherein the starter motor may be engaged in response to an engine shut down signal to reduce a speed of the engine by increasing a charge rate of the alternator; and
   wherein the starter motor controls an amount of time required to stop the engine to limit a volume of air provided to a catalytic converter during engine shut down.

9. A method of controlling a vehicle including an engine, an electric motor for starting the engine, a battery providing energy to the electric motor, and a transmission providing torque from the engine to a vehicle traction wheel, comprising:
   disengaging the engine from the transmission; and
   charging the battery with the electric motor to reduce the time required to reduce a speed of the engine to zero in response to an engine shut down signal.

10. The method of claim 9 wherein the electric motor is an engine starter motor.

11. The method of claim 9 further comprising a disconnect clutch that is selectively engaged to transfer torque between the engine and the electric motor, and wherein the electric motor is an electric machine that is operable to provide torque to the transmission, and wherein the method further comprises:
   engaging the disconnect clutch in response to the engine shut down signal to reduce the speed of the engine; and
   cutting off fuel to the engine until the engine is stopped.

12. The method of claim 11 further comprising:
   setting the electric machine in a generator mode to provide energy to recharge the battery in response to the engine shut down signal.

13. The method of claim 12 further comprising:
setting the transmission to neutral; and
setting a torque converter to neutral when the electric machine is utilized to reduce the speed of the engine and provide energy to the battery.

14. The method of claim 11 further comprising:
restarting the engine in response to a signal to override the engine shut down signal when the speed of the engine is determined to be less than a calibrated value and the electric machine is utilized to increase the speed of the engine and restart the engine.

15. The method of claim 11 further comprising:
restarting the engine in response to a signal to override the engine shut down signal when the speed of the engine is determined to be greater than a calibrated value and the engine is provided with fuel to restart the engine.

16. The method of claim 11 further comprising:
controlling an amount of time required to stop the engine to limit a volume of air provided to a catalytic converter during engine shut down.

\* \* \* \* \*